United States Patent [19]

Marbach

[11] 4,140,046
[45] Feb. 20, 1979

[54] PIERCING BLADE TEMPERATURE CONTROL

[75] Inventor: Walter V. Marbach, Palos Heights, Ill.

[73] Assignee: Union Carbide Corporation, New York, N.Y.

[21] Appl. No.: 806,290

[22] Filed: Jun. 13, 1977

Related U.S. Application Data

[63] Continuation of Ser. No. 617,266, Sep. 26, 1975, abandoned.

[51] Int. Cl.² ............................ B31B 1/14; B31B 1/64
[52] U.S. Cl. .................................... 93/33 H; 83/171; 93/DIG. 1; 156/515
[58] Field of Search ................. 156/515, 583; 53/373, 53/180 R; 83/171; 93/DIG. 1, 33 H, 33 R, 35 R, 8 R

[56] References Cited

U.S. PATENT DOCUMENTS

| 2,441,757 | 5/1948 | Doering et al. | 83/171 X |
| 2,808,690 | 10/1957 | Mahaffy et al. | 53/373 X |
| 2,997,905 | 8/1961 | Larson | 83/171 |
| 3,397,505 | 8/1968 | Critchell | 53/180 X |
| 3,654,841 | 4/1972 | Davis, Jr. | 93/33 H |
| 4,019,947 | 4/1977 | Stock et al. | 93/33 H X |

Primary Examiner—James F. Coan
Attorney, Agent, or Firm—Maurice W. Ryan

[57] ABSTRACT

A sheet piercing blade used to form perforate separation lines across continuous strip partible flattened tubular plastic film packaging bags is maintained a preselected optimum operating temperature by a heat transfer fluid medium circulating through a duct in substantially contiguous contact with the blade, a heat exchanger, and conduits connecting the duct and the heat exchanger.

1 Claim, 3 Drawing Figures

PIERCING BLADE TEMPERATURE CONTROL

This application is a continuation of our prior U.S. application: Ser. No. 617,266, filing date Sept. 26, 1975, now abandoned.

The invention relates to the production of continuous strip plastic film packaging bags and more particularly, to an apparatus improvement directed to the effective and precise temperature control of the piercing blade which continually forms perforate separation lines across flattened tubular plastic film packaging bag stock strips in process.

Packaging operations in industry, particularly those involving comestible products, meat for instance, require the maintenance of strict sanitary conditions. In many automatic and semiautomatic meat packaging operations, a consistently reliable supply source of usable packaging bags is of the greatest importance. Bags which tend to tear or give off one form or another of scrap materials, produce their own self contamination and can render useless what might otherwise be an efficacious packaging technique. It is also desirable that the bags fit the articles being packaged as closely and snugly as possible, not only for aesthetic reasons, but to effect better heat shrinking where this step is used and to avoid packaging material waste. Close fitting article packaging usually requires that bag mouths be stretched and it is essential that the bag mouth edges be capable of withstanding the requisite stretching stresses without tearing or developing weak spots which will subsequently tear or fail and thus destroy the complete package article.

Plastic film wrapping sheets and bags in continuous strips or strands, perforated to provide tear off lines for one at a time removal of the wrapping units, have been commercially available for some time now. The general technique of forming continuous strands of separable end-connected plastic film packaging units has been used intermediately in commercial production where the final product is a multiplicity of stacked or otherwise bundled individual sheets or bags. While the continuous strand perforated-connected mode of bag making works acceptably well with unoriented plastic films, it has been found to present serious problems with oriented plastic films which are currently in wide use as packaging materials in both sheet and bag form.

The problems present in using the aforesaid discussed perforation techniques on continuous plastic tubing to produce packaging bags of oriented plastic film are particularly manifest when these bags are used ultimately in situations involving bag mouth stretching. It has been found that any irregularity in the perforating blade used such as a nick or scratch will produce a corresponding defect in the perforated edge of the bag mouth which is upon the incidence of any stretching stress, will propagate into a ruinous tear, rendering the bag useless.

Towards solving this problem, oriented plastid film bags have been made according to the continuous strip technique using a heated blade to melt the plastic being perforated and thus obviate the occurrence of unwanted nicks, fissures and other imperfections. Efforts in this direction, however, cause another unwanted result, that is the welding closed of the bag mouths. Bags produced prior to the time of the present invention have therefore had to undergo an additional manufacturing step involving the cutting or guillotining off of each welded closed bag to produce a bag with a clean cut open mouth.

The invention disclosed in U.S. Pat. No. 4,064,776 to Walitalo et al goes a long way towards solving the aforementioned problems and provides a significant advance in the art. It has been found, however, that continuous production line type operation using heated piercing blades as taught by Walitalo et al eventually causes ambient temperature increases and a consequent blade heat rise to a temperature that causes unwanted bag mouth sealing rather than just the desired perforation edge annealing. Efforts to correct this condition were undertaken.

With this then being the state of the art, the present invention was conceived and developed with the primary purpose of providing a means to effectively and precisely control the temperature of the piercing blade used to make annealed edge perforations in continuous strip separable packaging bags.

The invention also, and more broadly, provides an apparatus for maintaining a stabilized substantially constant preselected temperature at the cutting edge of any type of elongate slicing, piercing, shearing, or other mode of blade used a continual sheet material cutting operation.

A significant and more specific advance in this invention is the provision of a heat stabilizing apparatus which continually removes heat from a cutting blade which is in a heat accumulative operating environment.

A further advantage of the invention is the provision of a heat stabilizing apparatus to remove excess heat from a heated blade which is operating in close proximity to a heat sealing element in a plastic bag manufacturing process.

These and other objects, features, and advantages of the invention will become the more readily apparent from the ensuing more detailed description and from the appended drawing wherein.

In general, the invention comprehends apparatus for the continuous transfer of heat from an elongate sheet piercing blade, comprising, in combination, a duct in substantially contiguous contact with said blade, a heat exchanger, conduit means connecting the duct and the heat exchanger, and means to continually circulate a heat transfer fluid medium through the duct, the conduit means and the heat exchanger.

In practical applications of the invention in making end-connected separable plastic packaging bags, the heat transfer medium is oil maintained by the heat exchanger at a temperature substantially equal to a preselected blade temperature.

Figure 1:
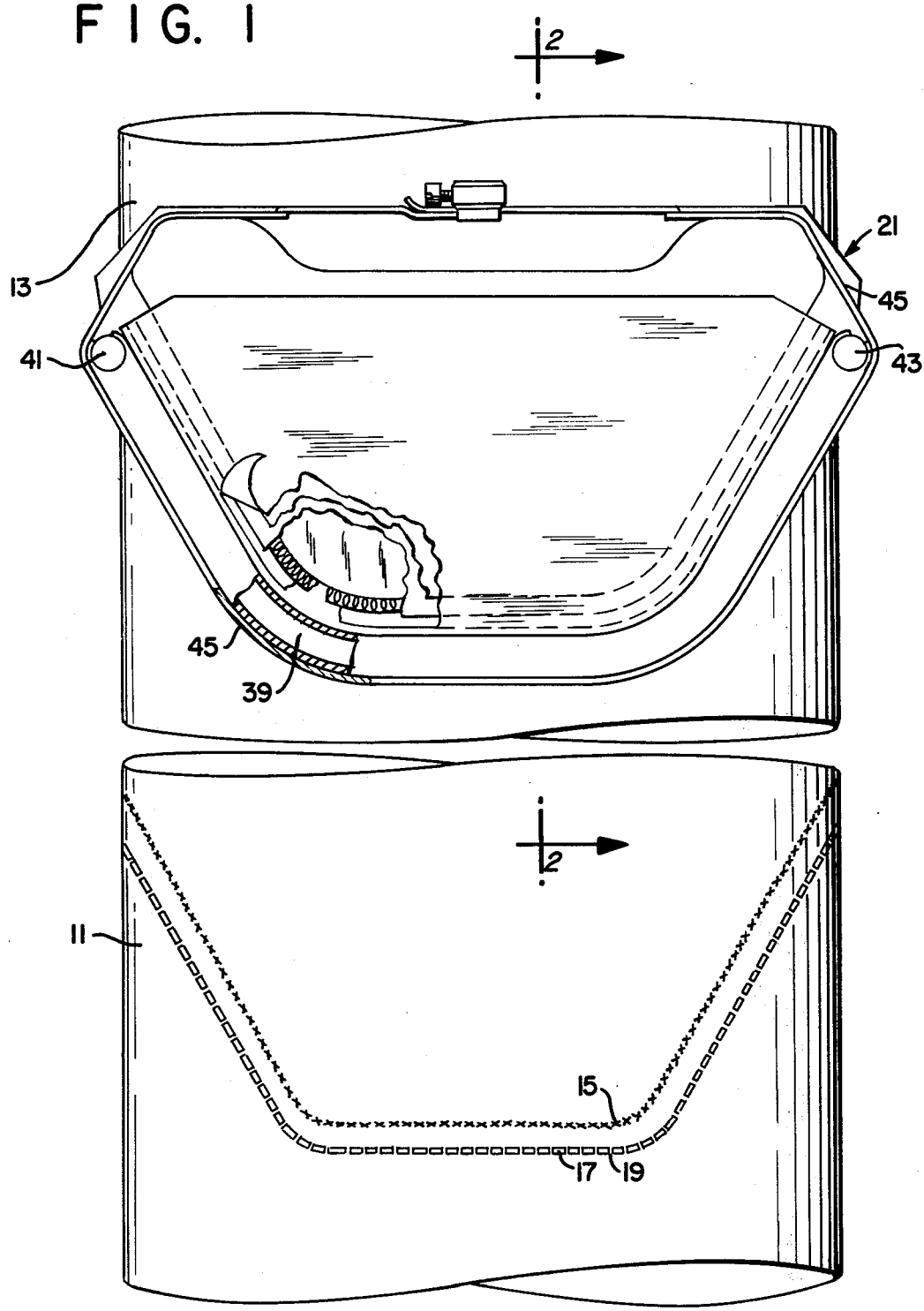
FIG. 1 is a plan view of an apparatus embodiment of the invention installed on a sealing head of a plastic bag production line.

With reference to the drawings, FIG. 1 shows a sealing-cutting head indicated generally as 21, in place above a continuous strand of flattened tubular film supply stock 13, in a plastic bag production line. As the sealing head 21 is repeatedly pressed down onto the continually advancing film stock 13, bags 11 are defined by a bottom forming heat seal 15 extending transversely across the flat width of the tubing and, closely adjacent each heat seal 15, a row of perforations 17 through both plies of the tubular stock 13. The film material left between the perforations 17 defines connecting tabs 19 which hold the bags together in the strand.

Figure 2:
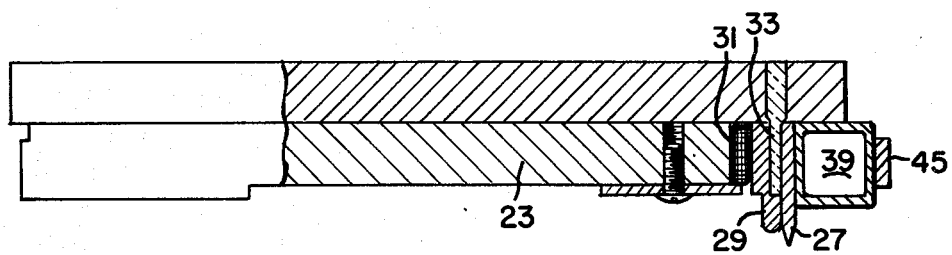
FIG. 2 is a sectional view taken along the section lines 2—2 of FIGS. 1.
Figure 3:
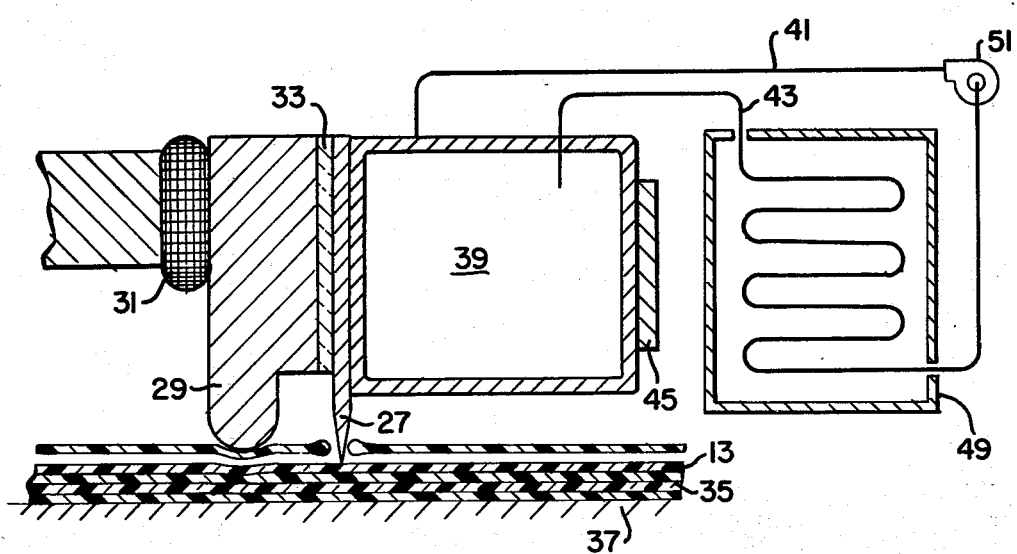
FIG. 3 is a simplified sectional schematic view illustrating the principal components combined in the invention.

The head 21 as viewed in FIG. 2 is seen to comprise a blade 27, a heat sealing bar 29, a heat source 31 and other components of apparatus not within the purview of this invention, all mounted on a sealing head base assembly 23 which is arranged and disposed to reciprocally move vertically at a bag forming station. The blade 27 is mounted on the sealing bar 29 through insulation spacers 33 and heat source 31 provides heat to both these elements, maintaining the sealing bar at a temperature to effect heat sealing of the film plies to form bag bottoms, and maintaining the blade at a temperature to effect annealing of the film material perforate cut edges. As shown in FIG. 3, a tubular plastic film supply stock 13 is disposed beneath the sealing bar and perforating blade on a resilient backing 35 subtended by a base 37. With the film supply stock thus advanced to the position shown, the sealing bar, perforating blade assembly is brought down to substantially simultaneously form a bag bottom heat seal with the sealing bar 29, and an array of tab-separated annealed edge elongate perforations with the balde 27. In the position illustrated in FIG. 3, the blade 27 is shown as having cut through one, the upper, of the two plies of the flattened tubing supply stock and with its cutting edge teeth in incipient piercing contact with the upper surface of the lower ply of the tubing. The spacing between the plies is exaggerated in the drawing for the purposes of illustration. Actually the plies are in wall to wall contact throughout the bag forming procedures described.

A duct 39 according to the invention is shown mounted contiguously to the blade 27. Duct 39, as shown, is rectangular in cross section, has an arcuate planform substantially congruent with the respective planform shapes of the blade 27 and the sealing bar 29 which define the mouth and bottom configurations of the bags 11, and is provided at its respective outboard ends with connection fittings to accommodate conduits 41, 43. The duct is held in position against the blade by a clamped strap 45 which passes completely around the sealing cutting head 21 assembly.

FIG. 3 shows schematically how the conduits 41, 43, connect duct 39 to a heat exchanger 49 and pump means 51 operably connected to the heat exchanger 49 to circulate a heat transfer medium through the heat exchanger, the conduits, and the duct.

EXAMPLE

A representative of apparatus according to the invention is installed in a packaging bag plant which manufactures assorted size end-connected separable plastic film packaging bags. Depending on the size of the sealing-cutting head, ducts 39 of various lengths are mounted against the piercing blades. The ducts are made of ⅜" square brass tubing general purpose, half hard temper, with a 0.031 inch wall thickness. In the operation of this representative embodiment of apparatus according to the invention, the fluid heat transfer medium used is electrical power transformer oil. A heat exchanger connected to a 70 gal./min. pump, powered by a ¾ horsepower, 1750 rpm. 3 phase, 230 volt electric motor serves a multiple array of production line sealing-cutting heads. A 90 gallon reservoir is provided to act as a system fluid accumulator. Each of the piercing blades is maintained at an operating temperature of from 160° F. to 200° F., preferably at about 170° F., by receiving heat from the sealing bar which is heated by a heating element 31, and giving heat up to the oil circulating through its associated duct 39. The oil flow through each individual duct 39 is regulated by an inlet orifice at the duct oil feed conduit to 1-½ to 2 gallons per minute. When the desired temperature of about 170° F. at the blade. is so maintained, it has been found that the oil temperature in the described system stabilizes at about 140° F. ±5° F. If the oil temperature increases beyond 145° F., cooling water is circulated through the heat exchanger to effect a lowering of the temperature to the desired range. This system according to the invention operates in ambient temperatures of 70° –75° F.

The exact temperatures, flow rates, speeds, and other applications parameters to practice the present invention will, in the light of this disclosure, be well within the ken of persons coversant with the art of plastic bag manufacture.

Several types of plastic packaging bags have been made successfully with the use of this invention, including bags of biaxially oriented polyethylene film and of biaxially oriented polyvinylidene chloride.

The foregoing disclosure is intended to be descriptive only of the invention, and is not to be construed in any limiting sense.

What is claimed is:

1. In an apparatus for forming continuous strip separable packaging bags with a heat seal bar to form bag bottom seals, a heated bag material piercing blade, and a heat source to provide heat for said blade, the improvement of blade temperature lowering and stabilization apparatus comprising, in combination, a fluid-tight duct mounted in heat transfer relationship contiguously with said blade, heat exchanger means independent and separate of the heat source which provides heat for said blade adapted to conduct heat from said blade and said duct, conduit means operably connecting said duct and said heat exchanger means, a fluid heat transfer medium in the duct and the heat exchanger means, and pump means arranged and disposed to continuously circulate said fluid heat transfer medium through the duct, the conduit means, and the heat exchanger means, whereby the piercing blade is maintained substantially at a preselected bag material annealing temperature.

* * * * *